United States Patent
Fredericks et al.

(10) Patent No.: US 7,429,917 B2
(45) Date of Patent: Sep. 30, 2008

(54) LED AVIATION WARNING LIGHT WITH FAULT DETECTION

(75) Inventors: Thomas M. Fredericks, Westbrook, CT (US); Kenneth S. Lemieux, East Haddam, CT (US)

(73) Assignee: Whelen Engineering Company, Inc., Chester, CT (US)

(*) Notice: Subject to any disclaimer, the term of this patent is extended or adjusted under 35 U.S.C. 154(b) by 164 days.

(21) Appl. No.: 11/363,389

(22) Filed: Feb. 27, 2006

(65) Prior Publication Data

US 2007/0200725 A1 Aug. 30, 2007

(51) Int. Cl.
*B60Q 1/50* (2006.01)
(52) U.S. Cl. .................. 340/464; 340/945; 340/815.45; 324/500; 315/76
(58) Field of Classification Search ............. 340/815.45
See application file for complete search history.

(56) References Cited

U.S. PATENT DOCUMENTS

| | | | | |
|---|---|---|---|---|
| 2,777,120 A * | 1/1957 | Madsen | ...................... | 340/982 |
| 3,532,928 A * | 10/1970 | West | ........................... | 315/83 |
| 5,095,274 A * | 3/1992 | Brokaw | ...................... | 324/414 |
| 5,313,165 A * | 5/1994 | Brokaw | ...................... | 340/661 |
| 5,347,224 A * | 9/1994 | Brokaw | ...................... | 340/458 |
| 5,955,945 A * | 9/1999 | Fuhrer | ........................ | 340/479 |
| 6,490,512 B1 * | 12/2002 | Niggemann | ................. | 340/458 |
| 6,525,668 B1 * | 2/2003 | Petrick | .................. | 340/815.45 |
| 6,624,638 B2 * | 9/2003 | St-Germain | ................. | 324/500 |
| 6,667,623 B2 * | 12/2003 | Bourgault et al. | ........... | 324/414 |
| 6,956,494 B2 * | 10/2005 | Tichborne et al. | ...... | 340/815.45 |
| 7,046,160 B2 * | 5/2006 | Pederson et al. | ....... | 340/815.45 |
| 7,116,294 B2 * | 10/2006 | Stopa | ........................ | 345/82 |
| 2002/0043943 A1 * | 4/2002 | Menzer et al. | ............. | 315/291 |
| 2003/0209997 A1 * | 11/2003 | St-Germain et al. | ........ | 315/291 |
| 2004/0041702 A1 * | 3/2004 | Toulmin et al. | ............. | 340/500 |
| 2007/0040696 A1 * | 2/2007 | Mubaslat et al. | ............ | 340/657 |
| 2007/0108843 A1 * | 5/2007 | Preston et al. | .............. | 307/112 |

* cited by examiner

*Primary Examiner*—George A Bugg
*Assistant Examiner*—Eric M Blount
(74) *Attorney, Agent, or Firm*—Alix, Yale & Ristas, LLP

(57) ABSTRACT

An embodiment of an LED warning light includes a plurality of LED banks, each including a series of light emitting diodes. LED failure in one or more banks can result in a warning light that appears to be functional, but may not meet relevant standards for light production. The LED warning light monitors current flow through each LED bank to detect failure of an LED and produce a failure signal. The LED warning light includes a microcontroller programmed to evaluate the failure signals and take one or more pre-determined failure mode actions. Failure detection and failure mode actions are defined by program steps taken by firmware running in the microcontroller.

19 Claims, 4 Drawing Sheets

US 7,429,917 B2

LED AVIATION WARNING LIGHT WITH FAULT DETECTION

BACKGROUND OF THE INVENTION

1. Field of the Invention

The invention relates generally to external lighting for aircraft and more particularly to an LED aviation warning light incorporating redundancy and fault detection features.

2. Description of the Related Art

Civilian air traffic control agencies such as the FAA specify standards for aircraft external lighting. Aircraft operating at night in civilian airspace are required to display lights to attract the attention of other aircraft operating in the same airspace. These external aircraft lights include flashing anti-collision lights mounted on the aircraft's upper and lower fuselage, as well as position/navigation lights on the tail and the wing tips. The location, color, intensity and light radiation pattern for each particular light is typically specified by the relevant regulation.

Aircraft external lighting have previously been provided by "strobe" lights or incandescent lamps. Incandescent and strobe lamps suffer from relatively high power consumption and relatively short service life.

With advances in the efficiency of light output from light emitting diodes (LEDs), it is now possible to replace incandescent and strobe lamps with LED light sources. LED light sources are attractive because of their extremely long service life and relatively low power consumption. High-output LEDs, such as the Luxeon™ emitter from LUMILEDS™ of San Jose, Calif., in certain configurations can achieve the required light output and radiation pattern for an aircraft position light.

Strobe and incandescent light sources typically employ a single light source, making failure of that light source readily apparent upon inspection. An LED light source may employ multiple LED light sources due to the relatively low quantity of light produced by each LED. If all of the LEDs are arranged in series, failure of any individual LED would extinguish the entire light. Alternatively, subsets of LEDs could be arranged in a series/parallel configuration such that failure of any one LED would extinguish only the LEDs in that series branch, with the remaining LEDs continuing to operate. This type of redundancy prevents total failure of the light assembly. However, partial failure of an aircraft warning light may result in a light that fails to meet the requirements of the relevant regulation, while appearing to function normally to the typical observer/inspector. There is a need in the art for an LED aviation warning light configured to continue to function after failure of one or more LEDs that is also configured to detect failure of the LED light sources and provide some indication of that failure.

SUMMARY OF THE INVENTION

It is accordingly an object of the invention to provide an LED warning light that detects failure of one or more LEDs in the warning light and is programmable to take one or more predetermined failure mode actions.

An embodiment of an LED warning light includes a plurality of LED banks, each including a series of light emitting diodes. A bank driver circuit is arranged to apply a drive current to each LED bank in response to a first input and to interrupt current to each LED bank in response to a second input. A bank sense circuit is connected to sense current flow through each LED bank and produce a first output indicative of normal current flow through said LED bank or a second output indicative of abnormal current flow through said LED bank. A microcontroller is programmed to produce the first and second inputs to said bank driver circuits and responsive to the presence of the second output to take a predetermined failure mode action.

Failure detection and failure mode actions are defined by program steps taken by firmware running in the microcontroller. For example, the microcontroller firmware can be configured to compensate for noise or spurious signals in the warning light to reduce the likelihood of false failure indications. Failure mode of the warning signal light is flexibly configurable by modification of the firmware. Examples of failure mode actions are shutting off the LEDs, changing the pattern of inputs to the bank driver circuits or generating a local failure indication or remotely detectable failure signal.

DETAILED DESCRIPTION OF THE PREFERRED EMBODIMENT

Figure 1:
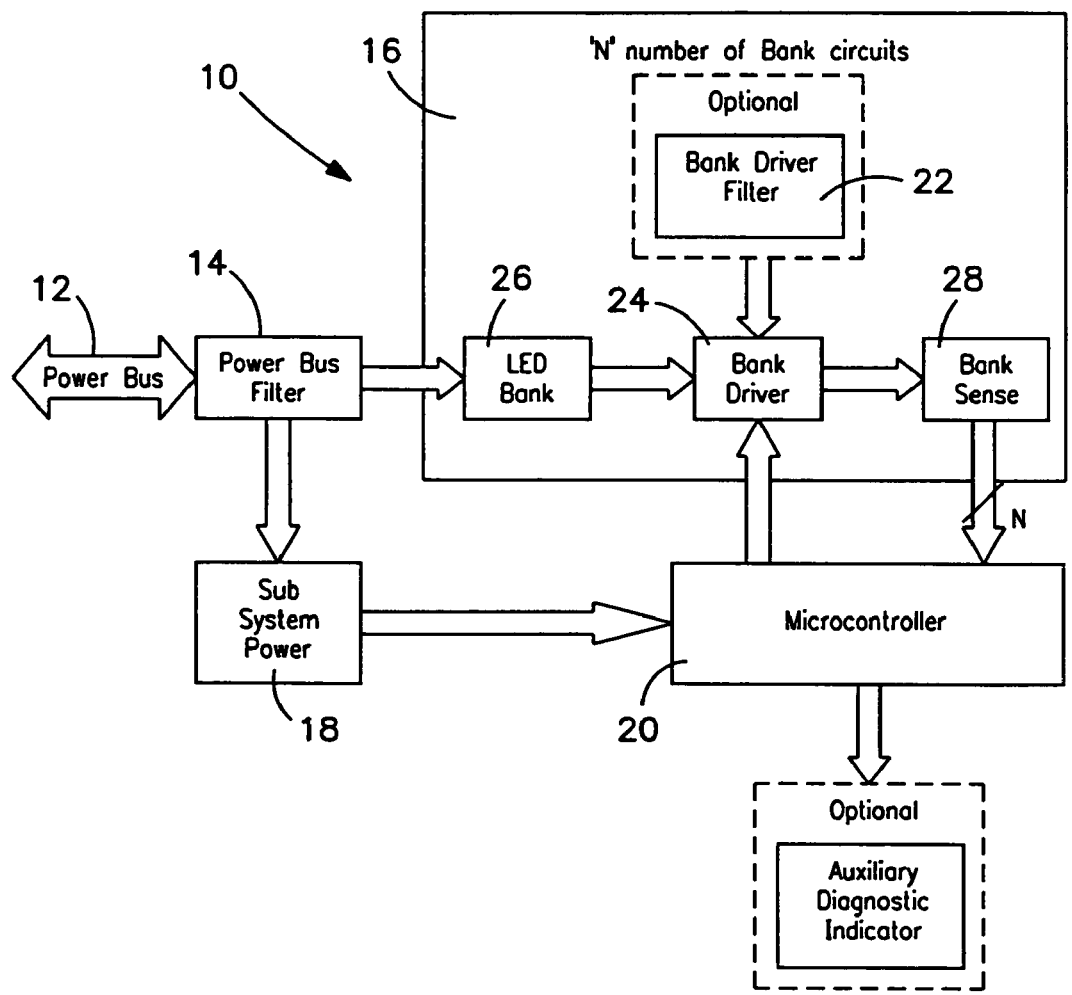
FIG. 1 is a functional block diagram of an embodiment of an LED aviation warning light according to aspects of the present invention.

A preferred embodiment of an LED aviation warning light will now be described with reference to FIGS. 1-5, wherein like numbers refer to similar parts. FIG. 1 is a functional block diagram of an exemplary LED aviation warning light 10 according to aspects of the present invention. The LED aviation warning light 10 is connected to a power bus 12 of an aircraft through a power bus filter 14. Filtered electrical power is delivered to a "N" LED bank circuits 16, one for each series bank or branch of LEDs in the warning light. Electrical power is also delivered to a subsystem power circuit 18 that produces regulated low voltages (5VDC, 8VDC) for use by the microcontroller 20 and associated circuitry.

Each bank circuit 16 may include a bank filter 22. Filtering between the electrical system and the aviation warning light 10 and/or bank circuits 16 protects the warning light from voltage spikes in the aircraft electrical system and also prevents noise from the warning light from feeding back into the aircraft electrical system.

Each bank circuit 16 includes a bank driver 24 configured to provide a constant current sinking path from each LED bank 26 to ground. The bank drivers 24 are controlled by the microcontroller 20. Bank sense circuits 28 are arranged to produce a first input to a microcontroller indicating normal current flow through each LED bank 26 or a second input to the microcontroller corresponding to a failure detected in an LED bank 26 and/or bank driver 24. Upon detection of a failure in an LED bank 26 and/or bank driver 24, the microcontroller 20 is programmed to take one of several possible actions, including providing a diagnostic indicator of the failure.

Figure 2:
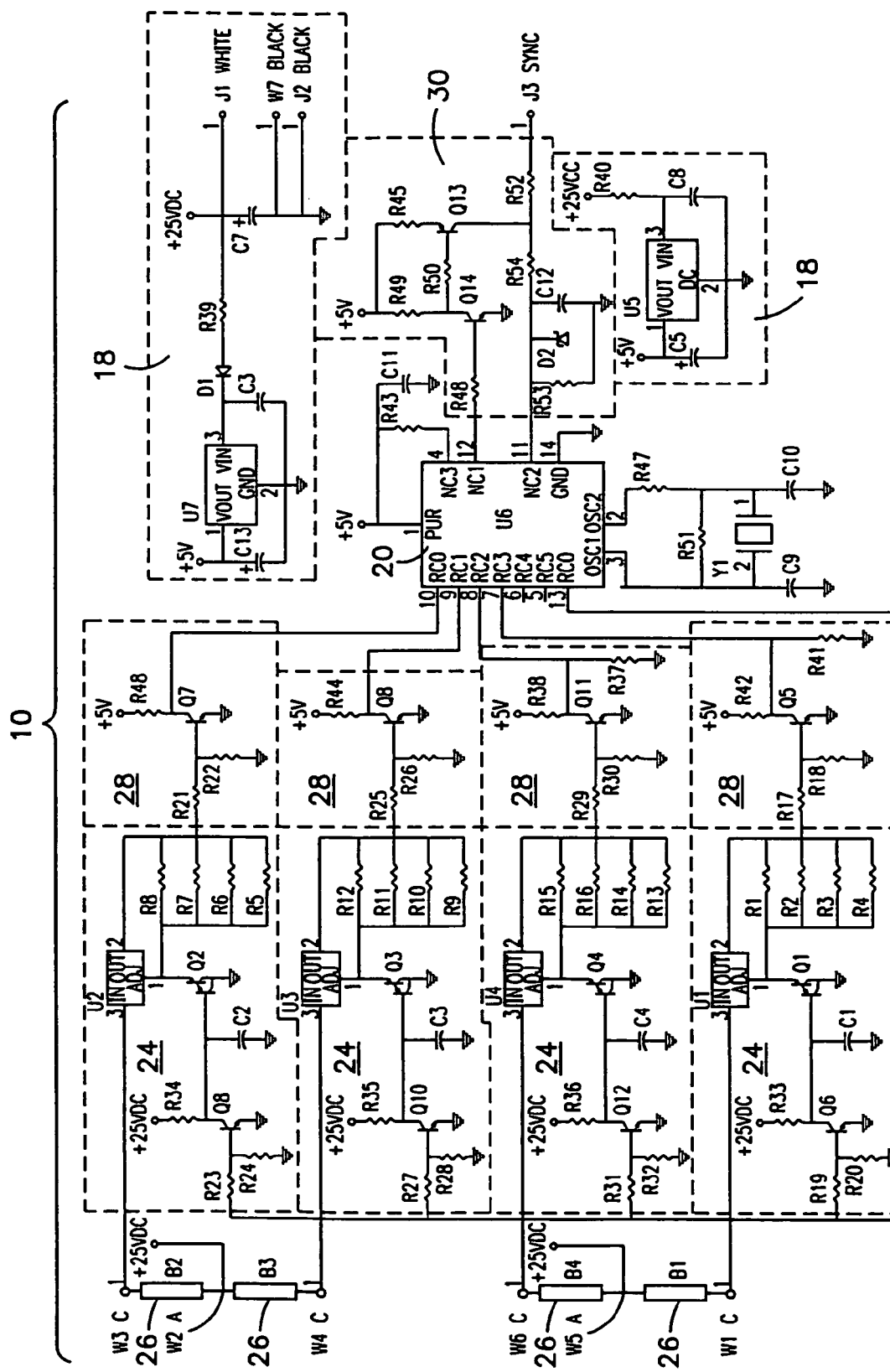
FIG. 2 is a schematic of the LED aviation warning light of FIG. 1.

A schematic of an exemplary LED aviation warning light 10 is shown in FIG. 2. LED banks B1, B2, B3, B4 are shown connected between filtered 28VDC aircraft power and a bank circuit. Each bank driver 24, includes a voltage regulator (U1, U2, U3, U4) arranged in a constant current configuration through respective Darlington pair transistors (Q1, Q2, Q3, Q4). Each Darlington pair transistor (Q1, Q2, Q3, Q4) is controlled by a transistor (Q6, Q8, Q10 and Q12, respectively), which are in turn controlled by a common signal from the microcontroller 20 (U8). The current flow path through each LED bank 26 passes through the input and output of the voltage regulator (U1, U2, U3, U4), a 4 resistor network and the Darlington pair transistor (Q1, Q2, Q3, Q4) to ground.

Bank sense circuits 28 employ transistors (Q5, Q7, Q9 and Q11) to sense current flow in the current flow path and provide a fault indication to microcontroller 20 (U8) in the absence of current flow through an LED bank. It will be understood that failure of an LED in the series of LEDs of an LED bank will result in an open circuit and the current flow through the bank having a failed LED will drop to zero. In the illustrated circuit, a logic level high at microcontroller inputs RC0, RC1, RC2, and RC3 indicates normal functioning of LED banks B1 through B4. Absence of current flow through the 4 resistor network of a respective bank driver will turn off the failure detection transistor (Q5, Q7, Q9 or Q11) corresponding to the failed bank and result in a logic level low at the corresponding input of the microcontroller.

The microcontroller is provided with 5 VDC power from the sub-system circuit 18. 8 VDC is provided to a synchronization circuit 30. The synchronization circuit allows the flash pattern of multiple LED aviation warning lights to be synchronized. The synchronization feature does not form part of the present invention and will not be described in any greater detail herein. Microcontroller 20 (U8) is provided with clock pulses at a low frequency of 32.768 KHz to minimize production of high frequency RF noise.

Figure 3:
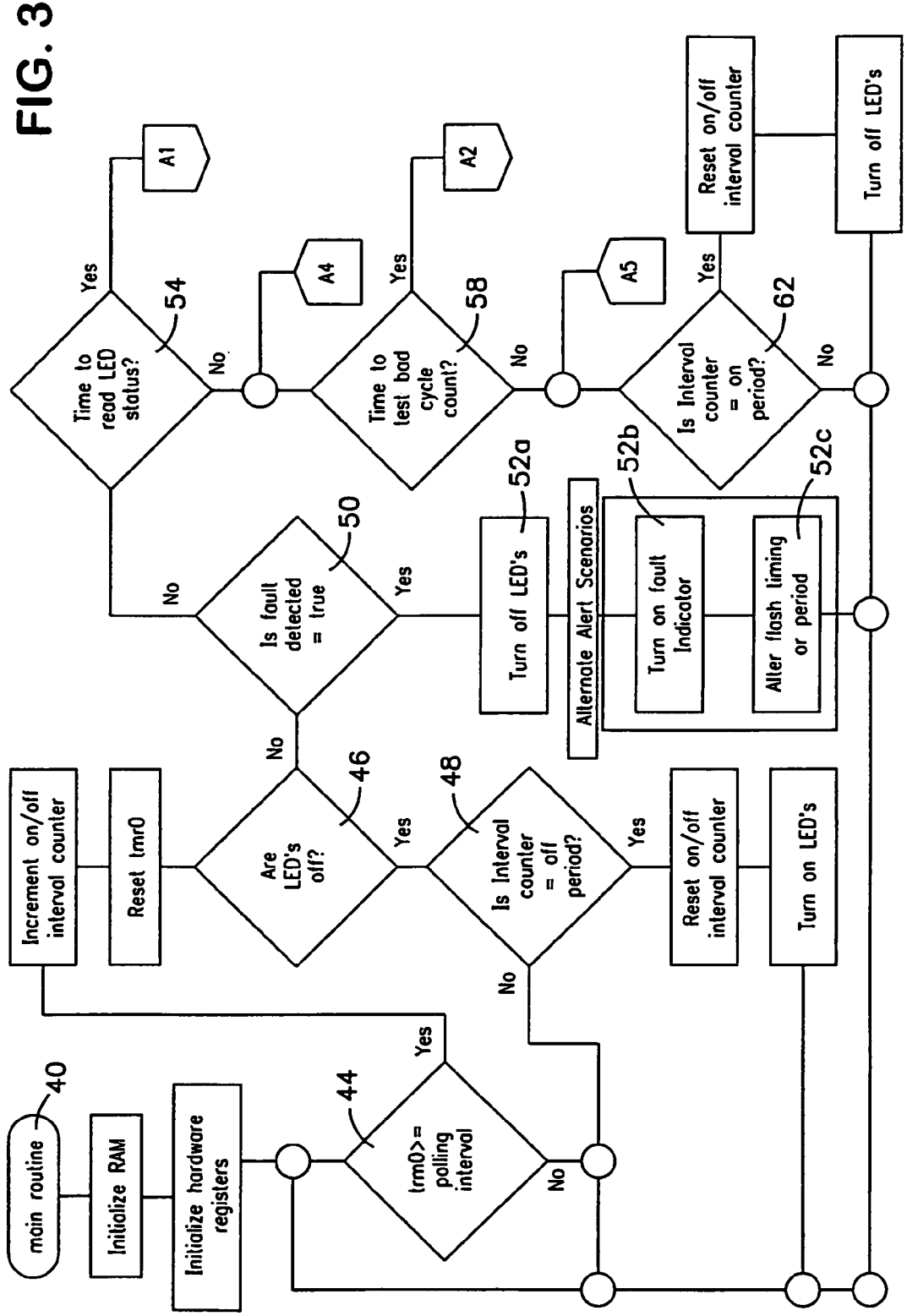
FIG. 3 is a software flow chart for a microcontroller program for use in the LED aviation warning light of FIGS. 1 and 2.
Figures 4, 5:
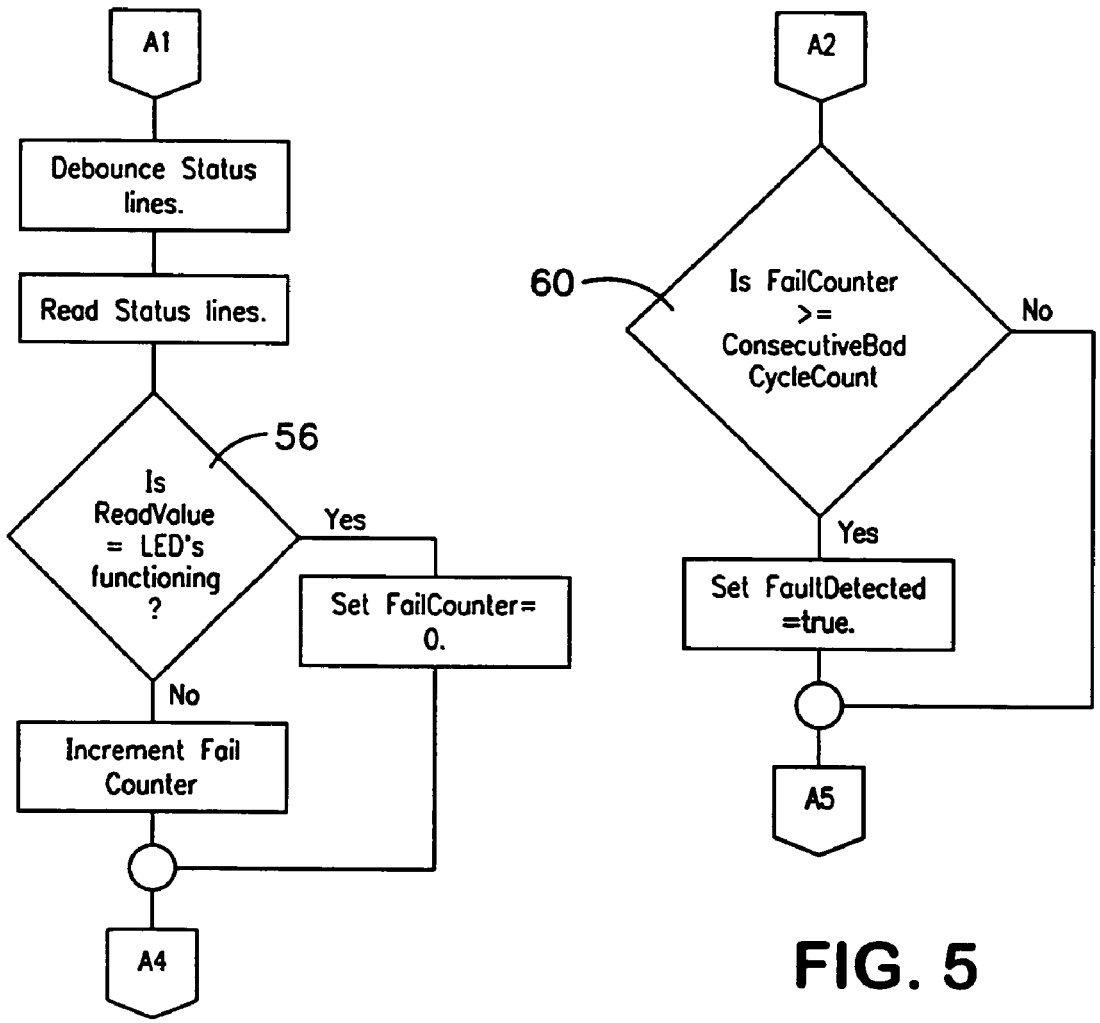
FIG. 4 is a flowchart of a subroutine for use in conjunction with the microcontroller program of FIG. 3.
FIG. 5 is a flowchart of a subroutine for use in conjunction with the microcontroller program of FIG. 3.

Relevant portions of the software of microcontroller 20 (U8) will now be discussed with reference to FIGS. 3-5. The software routine is of the polling type, running in a continuous loop. FIG. 3 illustrates a flowchart of the main polling routine 40. On power up, the software initializes the RAM and hardware registers of the microcontroller. The main routine 40 then checks a polling interval and resets a polling interval counter. The software then checks whether the LEDs are off. If the LEDs are off, the answer at 46 is yes and the software proceeds to check whether the interval counter equals the off period at 48. If not, the software proceeds to increment the interval counter and reset the timer to zero. If the interval counter equals the off period at 48, the main routine resets the on/off interval counter and turns on the LEDs. At the next polling increment the answer at 46 is no, i.e., the LEDs are on. The main routine proceeds to check if the fault detected equals true at 50. If fault detected equals true at 50, the microcontroller is programmed to take a predetermined action.

FIG. 3 illustrates several alternative actions such as turning off the LEDs 52a, turning on a fault indicator 52b, or altering the flash timing or period 52c. Failure mode of the present LED aviation warning light will be discussed in greater detail below. If the fault detected is not true at 50, the routine queries whether it is time to read LED status at 54. If the answer at 54 is yes, the main routine proceeds to subroutine A1 illustrated in FIG. 4. Subroutine A1 includes the step of debouncing the status lines (RC0, RC1, RC2, RC3 inputs to microcontroller 20 (U8)). Debouncing is a software routine that checks the condition of the status line over a period of time to eliminate spurious inputs such as voltage spikes or noise. Subroutine A1 then reads the status lines. At 56 the subroutine checks whether the read value indicates proper functioning of each LED bank. If the answer at 56 is yes, a failure counter is set to zero and the subroutine returns to the main routine at A4. If the answer at 56 is no, the subroutine increments the failure counter and returns to the main routine at A4. The main routine then checks at 58 to see if it is time to test the bad cycle count. If the answer at 58 is yes, the main routine enters subroutine A2 shown in FIG. 5.

Subroutine A2 compares the fail counter incremented in subroutine A1 to a predetermined consecutive bad cycle count at 60. The consecutive bad cycle count allows the failure detection function of the present invention to ignore momentary or spurious conditions affecting an LED bank by setting the consecutive bad cycle count in excess of 1. Typically, the consecutive bad cycle count will be set between 2 and 10. When the fail counter is incremented in subroutine A1 to the point where it equals the predetermined consecutive bad cycle count at 60, subroutine A2 sets the fault detected to true and returns to the main routine at A5. If the answer at 60 is no, the subroutine returns to the main routine at A5.

The main routine checks whether the interval counter equals the on period at 62. If yes, the on/off counter is reset, the LEDs are turned off and the main routine returns to step 44. It can be seen that the outcome of the fault detection query at 50 is determined by subroutines A1 and A2 which are in turn responsive to the condition of microcontroller inputs RC0 RC1, RC2 and RC3. The bank sense circuits 28 determine the status of inputs RC0, RC1, RC2 and RC3, as shown in FIG. 2.

For many practical reasons, it is desirable to configure an LED aviation warning light to drive multiple series strings, or banks of LEDs. One result of driving individual banks of LEDs is that failure of an LED in one bank will not extinguish the LEDs of the remaining banks. Thus it is possible for one or more banks of such an LED aviation warning light to fail, resulting in a reduced light output. To most observers, the LED aviation warning light will appear to be functional, but the warning light may not meet the specified light output.

To avoid the situation where such a partially failed LED aviation warning light continues in service for an extended period, the present invention includes a failure detection circuit as discussed above. It is possible to configure failure detection circuits using discrete components. However, a failure detection circuit having the capability shown in subroutines A1 and A2 would be exceedingly complex. Further, employing a programmable microcontroller permits alteration of the subroutines, main routine, and/or failure mode function without alteration of the LED aviation warning light hardware. For example, the consecutive bad cycle count could be raised or lowered to allow the failure detection to ignore anomalies present in the circuit.

One or more failure mode actions may be programmed into the microcontroller. One possible failure mode action would be to turn off all the banks of LEDs, giving a positive indication of failure. An alternate failure mode action would be to produce an electronic failure signal. Currently, aviation wiring systems are not equipped to receive such a fault indication. Such a fault indication might be converted to a visual signal by turning on a fault indicating LED located on the LED aviation warning light housing or otherwise visible to an inspector. A further alternative failure mode may include altering the flash timing or period of the aviation warning light as an alternative positive indication of failure. Currently, it is contemplated that the failure mode will be to turn off all the banks of LEDs.

While the invention has been described in terms of specific embodiments, those skilled in the art will recognize that modification of the invention can be made without departing from the spirit and the scope of the appended claims.

What is claimed is:

1. An LED warning light comprising:
   a plurality of LED banks, each comprising a series of light emitting diodes;
   a bank driver circuit connected to each said LED bank, each said bank driver circuit including a current source and an electronic switch operatively connected to deliver current to one of said LED banks when turned on and interrupt current to said one of said LED banks when turned off;
   a bank sense circuit operatively connected to sense current flow through each said LED bank independent of current flow through the other LED banks and produce a first output indicative of normal current flow through said LED bank or a second output indicative of abnormal current flow through said LED bank; and
   a microcontroller operatively connected to control the state of said electronic switches and responsive to the presence of said second output to take a predetermined failure mode action.

2. The LED warning light of claim 1, wherein said microcontroller is programmed to turn on said switches in a pre-determined pattern, thereby producing a warning light signal and said failure mode action is to turn off said switches so that no warning light signal is produced.

3. The LED warning light of claim 1, wherein said microcontroller is programmed to turn on said switches in a pre-determined pattern, thereby producing a warning light signal and said failure mode action is to turn on said switches in a different pre-determined pattern, visibly altering said warning light signal.

4. The LED warning light of claim 1, wherein said microcontroller is programmed to turn on said switches in a pre-determined pattern, thereby producing a warning light signal and said failure mode action is to turn on a fault indicator.

5. The LED warning light of claim 1, wherein said failure mode action is determined by a software program running in said microcontroller.

6. The LED warning light of claim 1, wherein said microcontroller is programmed to take said failure mode action only if said second output is present for a pre-determined time.

7. The LED warning light of claim 6, wherein said pre-determined time is adjustable by changing a software program in said microcontroller.

8. An LED warning light comprising:
   a plurality of LED banks, each comprising a series of light emitting diodes;
   a bank driver circuit responsive to a first input to deliver current and a second input to interrupt current to each of said plurality of LED banks;
   a bank sense circuit operatively connected to sense current flow through each said LED bank and produce a first output indicative of normal current flow through said LED bank or a second output indicative of abnormal current flow through said LED bank; and
   a microcontroller programmed to produce said first and second inputs and responsive to the presence of said second output to take a predetermined failure mode action.

9. The LED warning light of claim 8, wherein said microcontroller is programmed to produce said first and second inputs in a pre-determined pattern, thereby producing a warning light signal and said failure mode action is to stop producing said first input.

10. The LED warning light of claim 8, wherein said microcontroller is programmed to produce said first and second inputs in a pre-determined pattern, thereby producing a warning light signal and said failure mode action is to produce said first and second inputs in a different pre-determined pattern, visibly altering said warning light signal.

11. The LED warning light of claim 8, wherein said microcontroller is programmed to produce said first and second inputs in a pre-determined pattern, thereby producing a warning light signal and said failure mode action is to turn on a fault indicator.

12. The LED warning light of claim 8, wherein said failure mode action is determined by software running in said microcontroller.

13. The LED warning light of claim 8, wherein said microcontroller is programmed to take said failure mode action only if said second output is present for a pre-determined time.

14. The LED warning light of claim 13, wherein said pre-determined time is adjustable by changing a software program in said microcontroller.

15. An LED warning light comprising:
   a plurality of LED banks, each LED bank comprising:
      a plurality of LEDs connected in series; and
      a bank driver circuit arranged to deliver current to said plurality of
   LEDs through an electronic switch;
   a bank sense circuit operatively connected to sense current flow through the plurality of LEDs in each said LED bank and produce a first output indicative of normal current flow or a second output indicative of abnormal current flow; and
   a microcontroller operatively connected to turn on said electronic switches and responsive to the presence of said second output to take a predetermined failure mode action.

16. The LED warning light of claim 15, wherein said microcontroller is programmed to actuate said electronic switches in a pre-determined pattern, thereby producing a warning light signal and said failure mode action is to turn on a fault indicator.

17. The LED warning light of claim 15, wherein said failure mode action is determined by software running in said microcontroller.

18. The LED warning light of claim 15, wherein said microcontroller is programmed to take said failure mode action only if said second output is present for a pre-determined time.

19. The LED warning light of claim 18, wherein said pre-determined time is adjustable by changing a software program in said microcontroller.

* * * * *